United States Patent
Larsson et al.

(10) Patent No.: US 7,778,342 B2
(45) Date of Patent: Aug. 17, 2010

(54) METHOD AND APPARATUS IN A MIMO BASED COMMUNICATION SYSTEM

(75) Inventors: Peter Larsson, Solna (SE); Svante Signell, Vällingby (SE); David Astely, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 701 days.

(21) Appl. No.: 10/582,997

(22) PCT Filed: Sep. 22, 2004

(86) PCT No.: PCT/SE2004/001358

§ 371 (c)(1), (2), (4) Date: Jun. 8, 2007

(87) PCT Pub. No.: WO2005/060123

PCT Pub. Date: Jun. 30, 2005

(65) Prior Publication Data

US 2007/0258392 A1 Nov. 8, 2007

(30) Foreign Application Priority Data

Dec. 19, 2003 (WO) .................... PCT/SE03/02058

(51) Int. Cl.
*H04B 7/02* (2006.01)
(52) U.S. Cl. .................. 375/267; 370/310; 455/101
(58) Field of Classification Search .......... 375/260; 370/310, 329, 395.21; 455/507, 522
See application file for complete search history.

(56) References Cited

U.S. PATENT DOCUMENTS

2003/0108117 A1 6/2003 Ketchum et al.
2004/0082356 A1* 4/2004 Walton et al. ............... 455/522
2004/0208183 A1* 10/2004 Balachandran et al. . 370/395.21

FOREIGN PATENT DOCUMENTS

WO 03/100986 12/2003

OTHER PUBLICATIONS

Dong et al ("Opportunistic transmission scheduling for multiuser MIMO systems" IEEE International Conference on Acoustics, Speech, and Signal Processing, 2003. Proceedings. (ICASSP '03), Publication Date: Apr. 6-10, 2003, vol. 5, On pp. V-65-V-68).*

(Continued)

*Primary Examiner*—David C Payne
*Assistant Examiner*—Leon-Viet Q Nguyen
(74) *Attorney, Agent, or Firm*—Nixon & Vanderhye P.C.

(57) ABSTRACT

Communication in a MIMO network is optimized by selecting a first set of users comprising at least one user, selecting a second set of users not comprised in the first set, adapting communication parameters for the first set of users according to a first principle suitable, e.g. SVD, adapting communication parameters for the second set of users according to a second principle, e.g. opportunistic MIMO, and transmitting to the first set of user terminals according to the first communication parameters and to the second set of user terminals according to the second communication parameters. In this way, communication with one or a few users can be optimized while network resources can be used in an efficient way also for other users.

16 Claims, 4 Drawing Sheets

OTHER PUBLICATIONS

Chinese Office Action mailed Jan. 16, 2009 in corresponding Chinese Application No. 200480041690 with English translation.

International Preliminary Report on Patentability issued Jun. 20, 2006 (6 pages).

International Search Report for PCT/SE2004/001358 dated Dec. 22, 2004.

Hwang et al., *A random beamforming technique in MIMO systems exploiting multiuser diversity*, IEEE International Conference on Communications, 2003, ICC '03, May 11-15, 2003, vol. 5, pp. 3225-3229.

Dong et al., *Opportunistic transmission scheduling for multiuser MIMO systems*, 2003 IEEE International Conference on Acoustics, Speech, and Signal Processing, 2003, Proceedings (ICASSP '03), Apr. 6-10, 2003, vol. 5, pp. V65-V68.

Heath et al., *Multiuser diversity for MIMO wireless systems with linear receivers*, Conference Record of the Thirty-Fifth Asilomar Conference on Signals, Systems and Computers, 2001, Nov. 4-7, 2001, vol. 2, pp. 1194-1199.

* cited by examiner

METHOD AND APPARATUS IN A MIMO BASED COMMUNICATION SYSTEM

This application is the US national phase of international application PCT/SE2004/001358 filed 22 Sep. 2004, which designated the U.S. and claims priority to PCT/SE03/02058 filed 19 Dec. 2003, the entire contents of each of which are hereby incorporated by reference.

TECHNICAL FIELD

The present invention relates to a communication in a communication network involving several user terminals communicating with at least one transmitter node having a plurality of antennas and, each of the user terminals comprising at least one antenna.

BACKGROUND

Solutions involving Multiple Input Multiple Output (MIMO) antenna configurations, in which both the transmitter and the receivers have multiple antennas, are being considered for use in wireless communications networks to improve system performance in terms of peak data rate, coverage and capacity.

In the general case, in such a system, both the transmitter and the receivers have multiple antennas. This results in a number of possible radio channels, between each transmitter and receiver antenna. A channel matrix H can be defined to characterize all the channels. If N transmit antennas and M receive antennas are used the size of the channel matrix H will be M×N. H generally varies over time.

In the case when the channel is known to the receiver but not to the transmitter, data is transmitted uniformly in all directions, and the channel capacity can be expressed as $$C = lg_2\left(\det\left(I + \frac{\rho}{N}H \cdot H^*\right)\right) \quad (1)$$

where N is the number of antennas at the transmitter, $\rho$ is the total received transmit power divided by the noise power at the receive side, I is the identity matrix, and * is the Hermitian operator.

It is well known that under fading conditions with statistically uncorrelated propagation channel, the channel capacity measured in bits per channel use scales (from an information theory point of view with fixed average transmit power) on average as $$C_{MIMO} = C_{SISO} \cdot \min\{M, N\}, \quad (2)$$

where $C_{SISO}$ is the channel capacity for (traditional) single transmit single receive antenna communication (Single Input Single Output), i.e.

$$C_{SISO} = lg_2(1 + SNR_{SISO}), \quad (3)$$

where $SNR_{SISO}$ is the SISO signal to noise ratio and $C_{MIMO}$ is the resulting MIMO channel capacity. When M=N the channel capacity is N times the SISO channel capacity, i.e.

$$C_{MIMO} = N \cdot C_{SISI} \quad (4)$$

Note that SISO communication has a logarithmic relation for channel capacity with respect to SNR (see eq.(3)). The benefit from MIMO transmission with multiple data streams is that instead of using all power in one stream, multiple parallel streams are used with slightly lower SNR instead. In this way a capacity multiplication is obtained instead of a logarithmic increase in capacity.

So far, the discussion has been concerned with the case that the transmitter does not know anything about the channel matrix H. For the case when the transmitter has knowledge about the channel, performance can be further improved by transmitting data streams with different powers on the different modes of the channel. In addition, the channel knowledge can also be used to reduce the terminal complexity when demodulating and decoding the received signals.

An extensive overview of MIMO is found in A. Goldsmith, S. A. Jafar, N. Jindal, S. Vishwanath, "Capacity Limits of MIMO Channels", IEEE Journal on Selected Areas of Comm., VOL. 21, NO. 5, JUNE 2003.

One recent, alternative, way of handling communication in MIMO systems is opportunistic MIMO, which is also sometimes called multiuser diversity MIMO. The idea is that one may, for each of potentially many channels, send not all MIMO streams (hereafter called MIMO subchannels) to a single user, but instead distribute the MIMO subchannels over several users. This can be accomplished in an opportunistic manner by selecting users based on Carrier to Interference Ratio (CIR) information fed back from the receiving users. In MIMO, CIR information is fed back for each MIMO subchannel. The more receivers present, the more likely it will be that one finds "good" channels, and this is guaranteed in a statistical sense. The opportunistic MIMO architecture is illustrated, for example, in W. Rhee, W. Yu and J.M. Cioffi: "Utilizing Multiuser Diversity for Multiple Antenna System," Proceedings of IEEE Wireless Communication and Networking Conference (WCNC), p 420-425, September 2000, Chicago, USA.

Opportunistic MIMO makes use of the fact that with a large number of users, it is likely that the MIMO channels may have realisations in which one or several MIMO streams may be received with high quality by one or more users despite the fact that no CSI is used to predict the signals at the transmitter. This is achieved even when using simple non-optimal demodulation methods such as zero-forcing. In the end, it is the base station that determines which MIMO subchannel to use for which user. In addition to zero-forcing, other well-known demodulation methods such as MMSE, Successive Interference Cancellation (SIC), Parallel Interference Cancellation (PIC), or other Multi user detection schemes (MUD) can be used.

Opportunistic MIMO is feasible in situations where a large number of users are involved and data is pending transmission to them. Performance in situations where only a few users are involved is lower.

SUMMARY

It is an object to optimize the overall use of network resources in a multi-user, multi-antenna communication network.

This object is achieved by a communication method for use in a communication network involving several user terminals communicating with at least one transmitting node, said transmitting node comprising a plurality of antennas, each of said user terminals comprising at least one antenna, said method being characterized by:

selecting a first set of users comprising at least one user, selecting a second set of users not comprised in the first set, adapting communication parameters for the first set of users according to a first principle suitable for optimizing communication with the first set of users, adapting communication parameters for the second set of users according to a second principle which is different from the first principle, in response to communication parameters selected by the first set, transmitting to the first set of user terminals according to the first communication parameters and to the second set of user terminals according to the second communication parameters.

The object is also achieved by a transmitter node for use in a MIMO based communication network involving several user terminals communicating with the transmitter node, wherein each of said user terminals comprises at least one antenna, said transmitter node comprising a plurality of transmit antennas arranged to transmit information to a plurality of receiver nodes, said transmitter node comprising:

selection means for selecting a first set of user terminals comprising at least one user terminal and a second set of user terminals not comprised in the first set first adaptation means for adapting first communication parameters for the first set of user terminals according to a first principle suitable for optimizing communication with the first set of user terminals, second adaptation means for adapting second communication parameters for the second set of user terminals according to a second principle which is different from the first principle, in response to communication parameters selected by the first set, transmit means for transmitting to the first set of user terminals according to the first communication parameters and to the second set of user terminals according to the second communication parameters.

First, an algorithm is applied to a first user, or group of users, that optimizes communication with that group of users. The first set of user is normally a small group of users relative to the total number of users. Then, whenever possible or desirable, communication is initiated with other users using a different optimization algorithm, or principle. In this way communication with one or a few users can be optimized while network resources can be used in an efficient way also for other users.

In a preferred embodiment the first principle involves optimization with respect to Channel State Information (CSI), for example with a Singular Value Decomposition (SVD) of the channel matrix. Unitary beamforming matrices obtained from the SVD are then used in both the transmitter and a single receiver (in the first set of user terminals) to create a set of multiple orthogonal non-interfering MIMO subchannels.

For the second group feedback is transmitted, based on the SVD based transmission, from the second group to the transmitter. The receiver in the second group to which the transmitter is to transmit at any given time, and the substream to be transmitted to this receiver, are determined in an opportunistic manner.

By adapting the transmitter and possibly the power allocation to different streams based on the CSI of one user, but then having the possibility to transmit the streams to other users the performance is improved as compared to transmitting the data to only the user for which the communication is optimized. The performance is always better than that offered by the SVD-MIMO method alone (i.e. when a single users link is optimized. For multiple user links that are optimized with respect to CSI, the aggregate performance is even better but traded against complexity increase).

An SVD of the channel matrix H is defined as follows:

$$U \cdot S \cdot V^* = SVD(H), \quad (5)$$

where U and V are unitary matrices, * is the Hermitian operator and S is a matrix with singular values ordered on the main diagonal. Assume now that M independent data streams are sent concurrently by multiplying each outgoing stream with a column of the matrix V at the transmitter and that the matrix U* is used at the receiver. In this way, a number of parallel, non-interfering streams are created, and the resulting channel seen by each stream will then be the corresponding element of the diagonal matrix S. The optimum capacity can then be determined through applying the water-filling theorem, which means that the transmit powers of each stream is selected as a function of the diagonal element in S, the receiver noise levels, and the intended total transmit power. It is, of course, also possible to use the same power on all streams, with only a small loss at high SNR. The rate, i.e. a link mode comprising a combination of modulation and coding scheme, is applied on each MIMO subchannel in response to the signal to noise ratio or other quality measure.

This kind of transmission with an SVD optimizes the communication for a single user, but the SVD approach cannot be used directly for multiple receivers. Another drawback is that SVD based MIMO requires full CSI to be known at the transmitter. The CSI must consequently somehow be communicated to the transmitter. If a user with slowly varying CSI is selected as the first set of user according to the invention, the amount of CSI data is reduced, while users with fast varying channels only reports CIR information for the MIMO subchannels.

As explained above, SVD can be used to optimize communication with one single user, while opportunistic MIMO communication is particularly advantageous for communication with several users at a time. When these two algorithms are combined in the inventive way, the overall result is a more efficient use of network resources than with either one of the algorithms on its own.

Other methods can be used instead of SVD for precoding the transmission to the first set of users, such as other antenna weight parameters or a non-linear precoding, as described in, for example, Fischer, Windpassinger, Lamp, Huber, "Space-Time Transmission using Tomlinson Harashima precoding", Proceedings of 4. ITG Conference on Source and Channel Coding, Berlin, January 2002, p 139-147, adapted for the channels of the first set of users. For a single receiver with multiple antennas, or several users each having one antenna, zero forcing can be used. A so called QR factorization of the channel matrix can also be done. In this case, the unitary Q matrix can be used in the transmitter, possibly combined with some form of encoding to reduce the interference experienced by a receiver.

Suitable for use as the second principle is the algorithm referred to above as opportunistic MIMO communication, affected by transmit parameters used for the selected users. The communication parameters for the second group or users should in this case be adapted on the basis of a stream quality indicator, such as CIR.

An opportunistic MIMO gain is evident already at merely two users present, while the real benefit in traditional opportunistic MIMO normally requires more users. The amount of channel feedback remains low, and is nearly comparable with a single SVD-MIMO users feedback.

The first and second groups of users may be selected according to different criteria, for example, a combination of inputs involving, for example, traffic and quality of service parameters, CSI knowledge, and/or antenna configuration of the user terminals.

Acronyms

MIMO Multiple Input Multiple Output
MISO Multiple Input Single Output
SIMO Single Input Multiple Output
SISO Single Input Single Output
SVD Singular Value Decomposition
CSI Channel State Information
CA Channel Adaptation
LA Link Adaptation
MCS Modulation and Coding Scheme
OFDM Orthogonal Frequency Division Multiplexing
CIR Carrier to Interference Ratio
MMSE Minimum Mean Square Error
SIC Successive Interference Cancellation
PIC Parallel Interference Cancellation
MUD Multi User Detection

DETAILED DESCRIPTION

Figure 1:
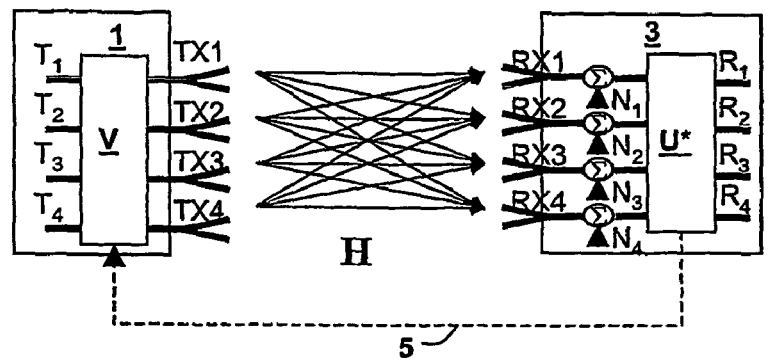
FIG. 1 shows a simple SVD based MIMO system involving one transmitter and one receiver.

FIG. 1 illustrates basic MIMO communication between one transmitter 1 comprising four transmitter antennas TX1, TX2, TX3, TX4 and one receiver 3 comprising four receiver antennas RX1, RX2, RX3, RX4. An SVD is used to optimize the communication between the transmitter 1 and the receiver 3. A channel matrix H represents all the channels between the transmitter antennas and the receiver antennas. T={T1, T2, T3, T4} is a vector of the transmitted streams which are weighted by the beamforming matrix V obtained from a decomposition of H, and then transmitted from the antennas TX1, TX2, TX3, IX4. R={R1, R2, R3, R4} is a vector of the reconstructed signal obtained after applying a unitary signal received at the receiver antennas RX1, RX2, RX3, RX4 and N={N1, N2, N3, N4} is a vector with Gaussian Noise added to the received signal vector R at the receiver antennas RX1, RX2, RX3 and RX4, respectively. As can be seen, each of the receiver antennas RX1, RX2, RX3, RX4 receives signals from all the transmitter antennas TX1, TX2, TX3, TX4. CSI information is transmitted from the receiver 3 to the transmitter 1 on a feedback channel 5 shown as a dashed line. U and V are the unitary matrices determined from the SVD of channel matrix H (see eq. (5)). The reconstructed signals in R may be decoded with state of the art decoding methods (not shown).

Figure 2:
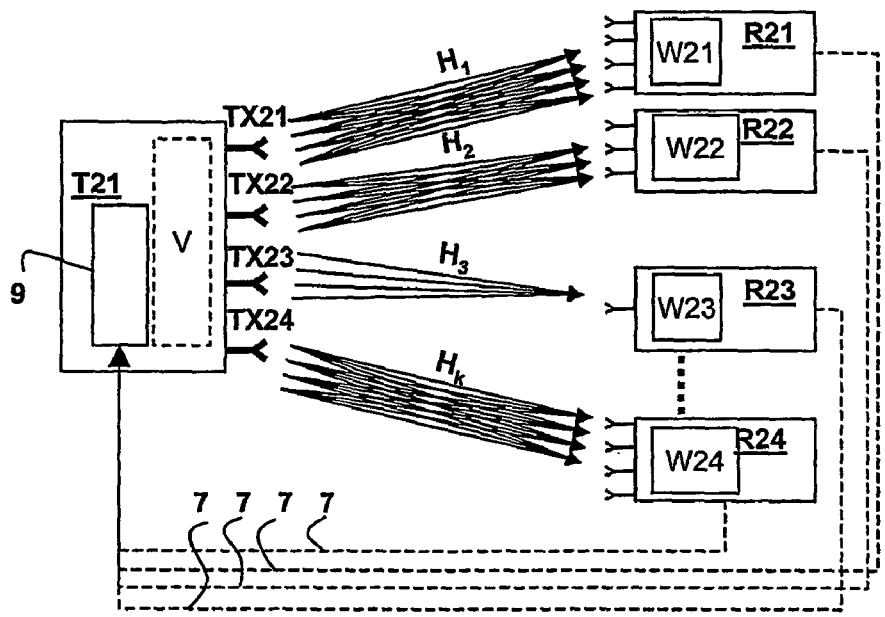
FIG. 2 shows a MIMO system involving one transmitter and four receivers, using opportunistic communication.

FIG. 2 illustrates an opportunistic MIMO architecture. It should be noted that each terminal may be equipped with an arbitrary number of antennas. One transmitter T21 comprising four transmitter antennas TX21-TX24 transmits data to four receivers R21, R22, R23, R24. The first and the fourth receivers R21, R24 have four receiver antennas each, the second receiver R22 has three receiver antennas and the third receiver R23 has one receiver antenna. Feedback channels 7 from each receiver to a control and scheduling unit 9 in the transmitter are shown as dashed lines. The feedback channels 7 are used for transmission parameters such as link adaptation and scheduling data for use by the transmitter. A number of buffers (not shown) comprise the information to be transmitted to the receivers.

The control and scheduling unit 9 selects the buffer from which to transmit at any given time, and whom to send to, based on feedback data. It also selects the MCS to use for the transmission. The control and scheduling unit 9 can also take into account quality of service parameters, such as the maximum delay time for a data packet, fairness requirements, etc. The weight matrices W21-W24 are used to adjust the reception at the respective receiver. In addition to weighting matrices, traditional receiver structures are used after the weighting matrices, but also more advanced receiver structures including multi-user detection/decoding can be used after the weighting matrices. In this case, the control and scheduling unit is arranged to identify receivers to which a good transmission quality is possible at any given time.

Figure 3:
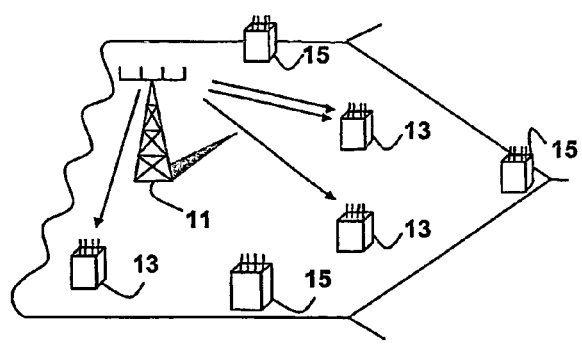
FIG. 3 shows one configuration after scheduling MIMO subchannel resources to different users.

FIG. 3 shows a cellular system comprising a transmitter, in this case a base station 11 communicating with a number of user terminals 13, 15 using multi-user MIMO, for example, opportunistic oriented MIMO. FIG. 3 shows the situation after scheduling MIMO subchannel resources to different users 13 that have provided CIR feedback to the base station at one instance. With other users 15 there is no current communication. In subsequent instances, the traffic flow configuration may/will change in response to channel variations. Also, some users may not receive any data, as their CIR conditions are unfavourable or simply because there is no data to send to them.

Figure 4:
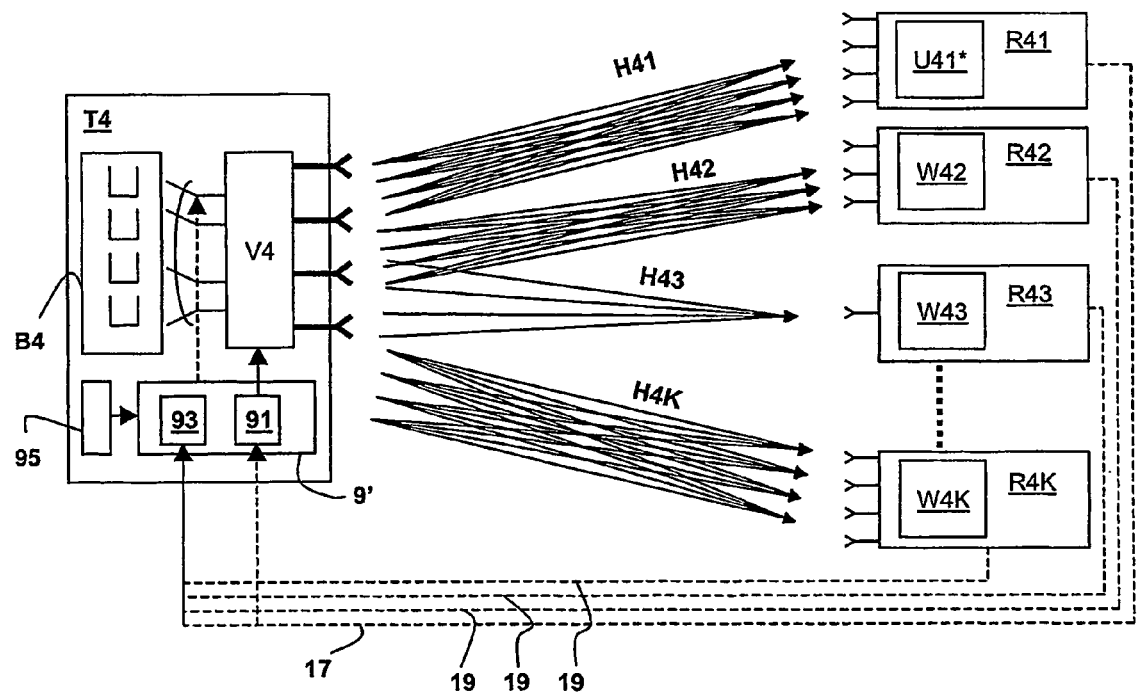
FIG. 4 illustrates a first non-limiting, example embodiment of a system in which SVD-based MIMO and opportunistic MIMO are combined.
Figure 5:
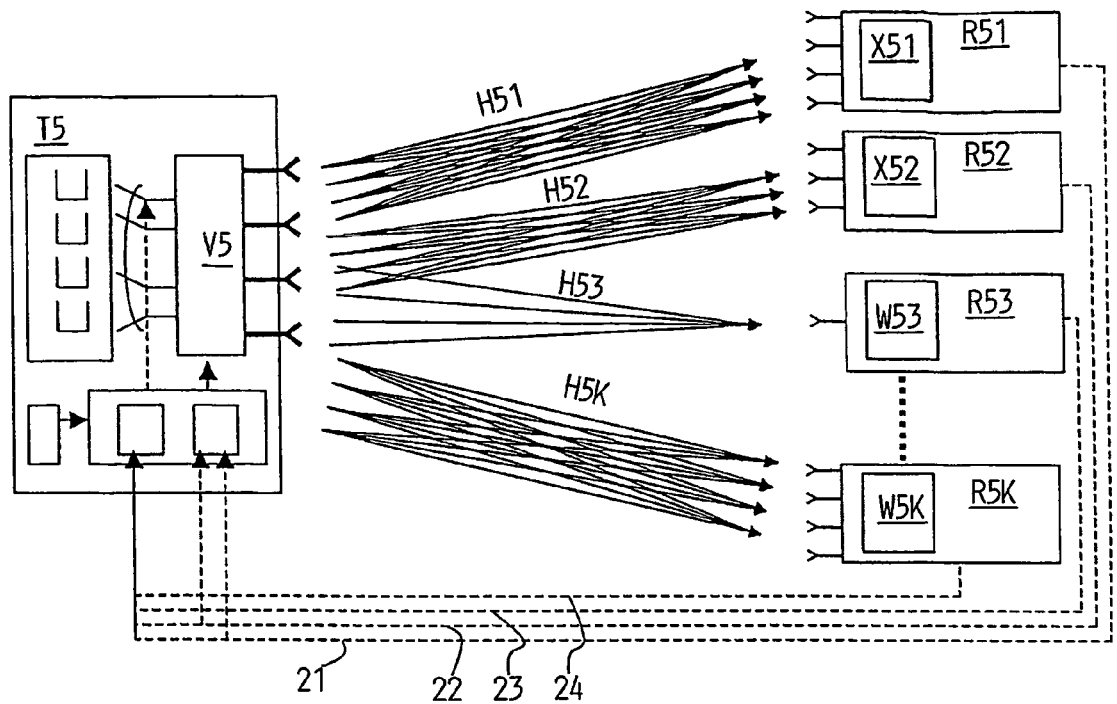
FIG. 5 illustrates a second non-limiting, example embodiment of a system in which SVD-based MIMO and opportunistic MIMO are combined.

FIGS. 4 and 5 show an overview of the basic idea, where one transmitter and in total K receiving users are available.

In FIG. 4, the transmitter T4 has selected to optimize the transmission to the first receiver R41 using an SVD. For each of the receivers, a channel matrix $H_k$ applies, k being the number of the receiver. In particular the first receiver R41 employs a weight matrix that is the Hermitian of the unitary matrix $U_1$ derived from the SVD of channel H41, whereas the transmitter uses the unitary SVD matrix V4, similarly derived from channel H41. On a feedback channel 17, shown as a dashed line from the first receiver R41 to the transmitter T4, CSI information that is needed for SVD-based MIMO is transmitted to the weighting block V4 in the transmitter. The CSI may also, if a reciprocal channel exists, be determined for the R41 to T4 channel, e.g. by sending a MIMO channel estimation symbol form R41 to T4 and subsequently estimating the channel. In this case, the interference characteristic at R41 may also be signalled back to T4. With respect to transmit adaptation, an alternative method can be used for precoding the transmission to the first receiver, such as other antenna weight parameters or a non-linear precoding adapted for user one's channel. In particular, the interference pattern (instantaneous or statistically characterised) at the receiver may be taken into account at the antenna weight parameter selection.

To the remaining users R42, . . . , R4K, opportunistic communication is used. From each of the remaining users R42, . . . , R4K a feedback channel 19 transmits MIMO CIR feedback or other feedback indicative of preferred link mode to use, to the control and scheduling unit 9'.

In this embodiment, the control and scheduling unit 9' comprises a pre-processing unit 91 arranged to receive the CSI information transmitted on the feedback channel 17, pre-process it if applicable and forward it to the weighting block V4. The control unit will, based on input from other units, taking into account e.g. QoS requirements, buffer status and prioritization criteria, in addition to possible CSI feedback and channel properties, such as speed, determine which receiver(s) that shall signal CSI and at what time. The pre-processing unit 91 is then arranged to receive the CSI on the feedback channels from the receiver(s) and optimize the weighting used in the weighting block V4.

The control and scheduling unit 9' also comprises a CQI information unit 93 arranged to receive channel quality information from all users and control the transmission from the buffers to the receivers not included in the first subset.

In the transmitter T4 a number of buffers in a buffer unit B4 comprise the information to be transmitted to the receivers.

The control and scheduling unit 9' selects whom to send data to at any given time based on feedback and selects the corresponding buffer from which the data is taken. It also selects the MCS to use for the transmission. The control and scheduling unit 9' can also take into account quality of service parameters, such as the maximum delay time for a data packet, fairness requirements, etc.

One or more other units 95 may be included as well, for providing information to the control and scheduling unit 9' for use when controlling the communication. This information may be, for example, quality of service information and/or terminal related information. The control and scheduling unit 9' can also receive queue information from the buffers.

In FIG. 5 the transmitter has decided that transmission parameters (meaning e.g. antenna weights and transmit powers) should be adapted to the channel state to a first subset of users consisting of the first and the second receiving users R51, R52, whereas the remaining users R53, . . . , R5K operate in opportunistic mode, under the constraint that overall transmission is optimized for the first subset of users. CSI information from the users R51 and R52 in the first subset is transmitted on respective feedback channels 21, 22 to the V matrix VS in the transmitter T5. (Or as previously described under FIG. 4, channel reciprocity may be exploited to the determine the channel states by sending channel estimation symbols from X51 as well as X52 to T5) From the other users R53, . . . , R5K only feedback regarding the stream quality is needed on respective feedback channels 23, 24. The first subset can involve more than two users.

In this case, a normal SVD of each channel to the users R51 and R52 in general cannot be used directly to determine transmit and receiver matrices. However, based on the channels H51 and H52, the transmitter may use a weight matrix $Y_{1,2}$ and the user one and two user weight matrixes X51 and X51. Those weight matrices may be optimized to maximize the aggregate capacity on both links (or more if more than two users are considered for the CSI adapted transmission) or other criteria may be applied involving maximizing the capacity with fairness constraints.

The buffers and control and scheduling unit of FIG. 5 are similar to those of FIG. 4, except that in FIG. 5 two users are included in the first subset of users.

This paragraph and the next one relate to adaptation of the user or users in the first subset. The user (or users) for whom the transmission(s) is (are) optimized, can be selected in several ways. The transmitter can use a combination of inputs involving, traffic and QoS parameters knowledge, CSI knowledge, antenna configuration knowledge of user terminals, decoding capability knowledge of user terminals. With respect to QOS, it may be appropriate to adapt transmission parameters to the user with the most stringent traffic requirements, for instance carrying real time voice or video traffic, whereas less stringent QoS requirement such as best effort may be supported by the opportunistic communication links. The selection may also be based on channel parameters, such as average path gain. It may be feasible to adapt to a user with poor reception quality to start with due to high path loss. The users with lower path loss (or better average SNR) can then employ opportunistic communication.

Adapting to a user with a single or few antennas can be advantageous, since other users terminals with potentially more antennas have greater possibility to exploit opportunistic MIMO. Also if the decoding capabilities are known not to be the best among a set of user terminals, then it may be wise to select the poorly operating user terminal, since other users terminals may still be able to operate well and decode signals transmitted with the opportunistic approach. Alternatively, users with channels with long coherence time can be selected. For such users, CSI update rates can be fairly slow which is beneficial since the CSI generally carriers more information than simply reporting CIR (or optionally a preferred link mode) for MIMO subchannels. Lastly, various fairness criteria's may be weight in to ensure that all, or near all, users are selected in such way that the transmit parameters are optimized for their channel. An example of such approach can be to employ a Round Robin method, where every user is selected on a regular basis.

It should be noted that everything that has been discussed so far applies to a single channel or a single subcarrier, such as in OFDM. It is therefore possible to use one set of choice, e.g. a selected SVD-MIMO user, on one set of subcarriers and another selected user on another subcarrier. This flexibility can be used in different ways to improve performance. For instance, users with certain MIMO capabilities may use certain part of channels, such as OFDM subcarriers.

Figure 6:
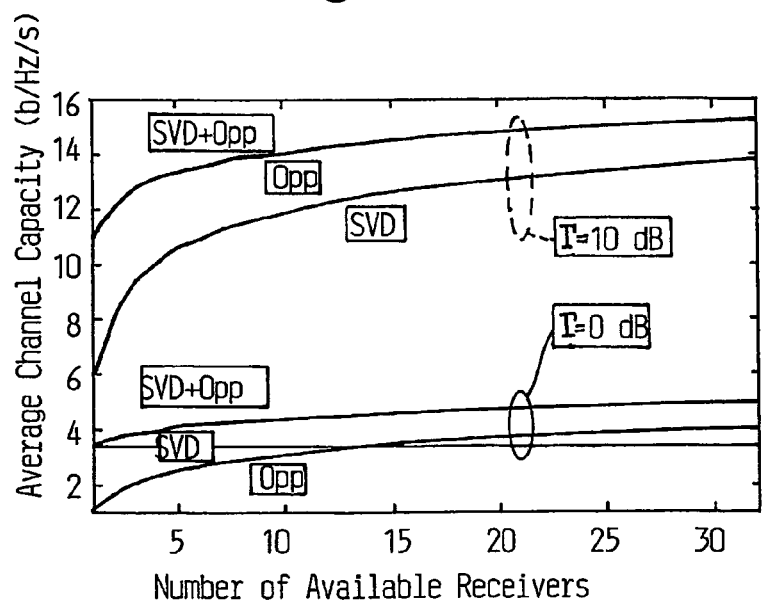
FIG. 6 shows a simulation of average channel capacity as a function of the number of available receivers using SVD-based MIMO, opportunistic MIMO and a combination of the two, respectively.

FIG. 6 shows the result of a simulation of the channel capacity in a MIMO system as a function of the number of available users, as a function of either 0 or 10 dB average SNR, Γ. Independent and identically distributed Rayleigh fading channels with the same mean average path loss were assumed. Three different principles are shown: only SVD-based communication, only opportunistic communication, and an example application of the technology described combining the two. As can be seen, for one user the combined algorithm is equal to SVD only. At any number of users higher than one, the combined algorithm provides a higher channel capacity. If only opportunistic communication is used the performance in this example is lower than SVD up to a certain number of users and improves as the number of users increases, but it is always lower than for the combined algorithm.

Figure 7:
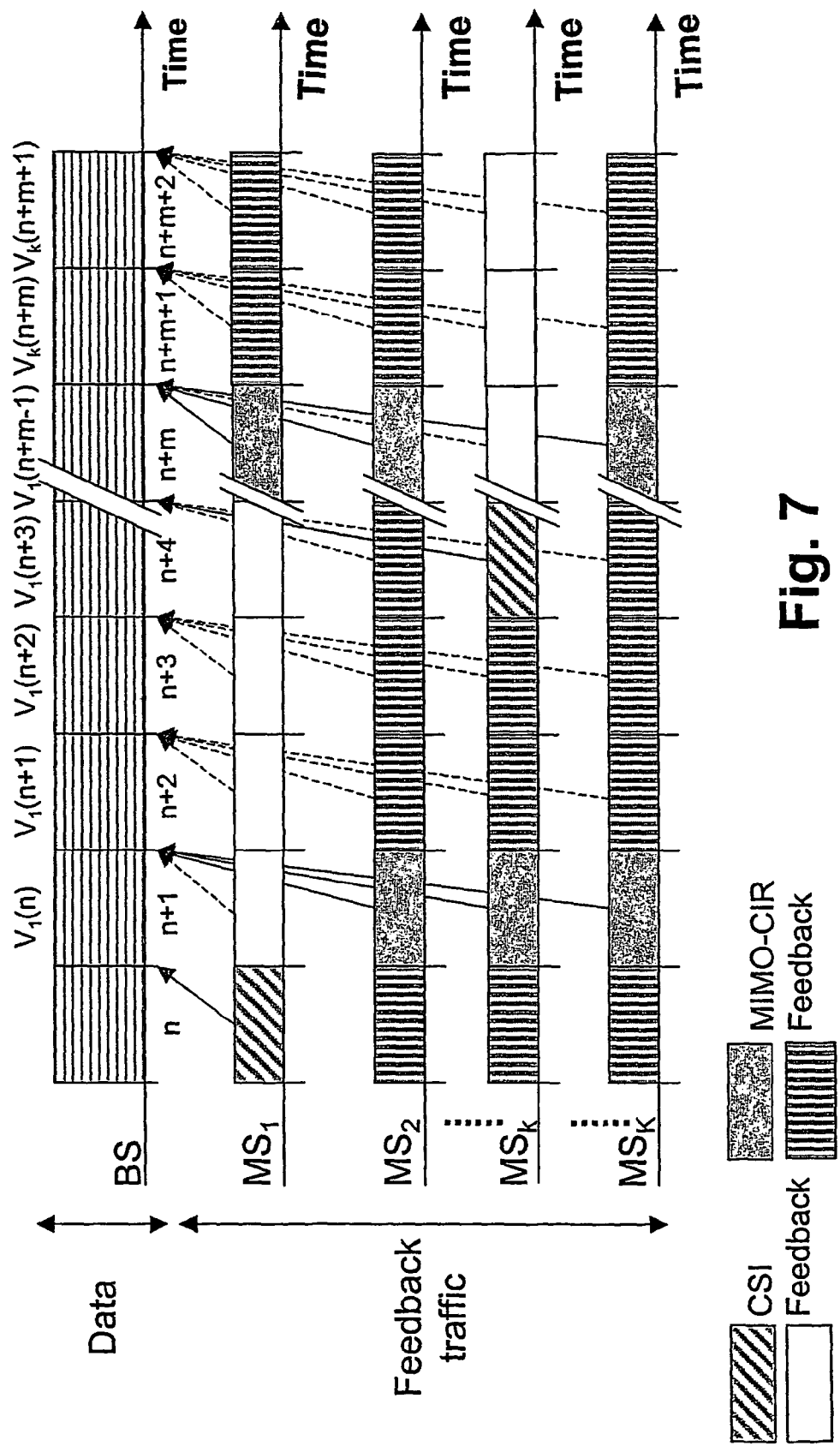
FIG. 7 shows an example of a protocol that may be used.

FIG. 7 shows one possible, but not the only, protocol implementation. A base station BS is communicating with a number of mobile stations MS1, MS2, . . . , MSK. $MS_1$ has been selected for the SVD optimization. For the remaining mobile stations MS2, . . . MSK, opportunistic MIMO is used. Hence, at time n, $MS_1$, sends CSI feedback information to the BS, indicated by a diagonally shaded box. The feedback information sets the MIMO-antenna weight matrix to a channel matrix $V_1$. In the following time slots CSI information is transmitted. The first transmission, i.e. at time n+1, from the BS is destined to $MS_1$ (instead of sending data, a channel estimation symbol may be sent which pass through the $V_1$ matrix). At time n+1, the other mobile stations can determine their respective MIMO-CIR quality (or preferred link mode) and feed it back to the BS (indicated as grey boxes). Also, $MS_1$ feeds back an update of the CSI. At time n+2, the BS determines which user or users to send to. That decision is based on the CSI for $MS_1$, and the MIMO-CIR quality for the other mobile stations. This procedure is repeated for subsequent time instances, until it is determined to select another user for optimized communication. In FIG. 6, this happens at slot n+m−1, where mobile station $MS_k$ starts reporting CSI information, that is, average and/or instantaneous knowledge of the channel and interference, to the BS (diagonally shaded or white boxes) and the other report MIMO-CIR information (indicated by grey or vertically shaded boxes).

The invention claimed is:

1. A communication method for use in a communication network involving several user terminals communicating with at least one transmitter node, said transmitter node comprising a plurality of antennas, each of said user terminals comprising at least one antenna, said method comprising;
    selecting a first set of user terminals comprising at least one user terminal;
    selecting a second set of user terminals not comprised in the first set;
    adapting first physical layer communication parameters for the first set of user terminals according to a first principle suitable for optimizing communication with the first set of user terminals;
    adapting second physical layer communication parameters, different from the first physical layer communications parameters, for the second set of user terminals according to a second principle, which is different from the first principle, in response to the first physical layer communication parameters for the first set; and
    transmitting to the first set of user terminals according to the first physical layer communication parameters and to the second set of user terminals according to the second physical layer communication parameters,
    wherein the first principle involves optimization with respect to full or partial Channel State Information (CSI), for example by Singular Value Decomposition (SVD), and the second principle makes use of opportunistic MIMO communication.

2. A method according to claim 1 wherein the first communication parameters are related to the transmit power and the beamforming matrix at the transmitter side.

3. A method according to claim 1, comprising the step of selecting the first set of user terminals in dependence of traffic and quality of service parameters.

4. A method according to claim 1, comprising the step of selecting the first set of user terminals in dependence of CSI knowledge.

5. A method according to claim 1, comprising the step of selecting the first set of user terminals in dependence of receiver antenna configuration.

6. A transmitter node for use in a MIMO based communication network involving several user terminals communicating with the transmitter node, wherein each of said user terminals comprises at least one antenna, said transmitter node comprising a plurality of transmit antennas arranged to transmit information to a plurality of receiver nodes, said transmitter node comprising:
    selection means for selecting a first set of user terminals comprising at least one user terminal and a second set of user terminals not comprised in the first set,
    first adaptation means for adapting first physical layer communication parameters for the first set of user terminals according to a first principle suitable for optimizing communication with the first set of user terminals,
    second adaptation means for adapting second physical layer communication parameters, different from the first physical layer communications parameters, for the second set of user terminals according to a second principle which is different from the first principle in response to the first physical layer communication parameters selected for the first set, and
    transmit means for transmitting to the first set of user terminals according to the first physical layer communication parameters and to the second set of user terminals according to the second physical layer communication parameters,
    wherein the first adaptation means is arranged to optimize communication with the first set of user terminals with respect to full or partial Channel State Information (CSI), for example by Singular Value Decomposition (SVD), and
    wherein the second adaptation means is arranged to optimize communication with the second set of user terminals according to opportunistic MIMO communication.

7. A transmitter node according to claim 6, wherein the first communication parameters are related to the transmit power and the beamforming matrix at the transmitter side.

8. A transmitter node according to claim 6, comprising wherein the selection means is arranged to select the first set of user terminals in dependence of traffic and quality of service parameters.

9. A transmitter node according to claim 6, wherein the selection means is arranged to select the first set of user terminals in dependence of CSI knowledge.

10. A transmitter node according to claim 6, wherein the selection means is arranged to select the first set of user terminals in dependence of receiver antenna configuration.

11. A MIMO based communication network involving several user terminals communicating with at least one transmitter node, said transmitter node comprising a plurality of antennas, each of said user terminals comprising at least one antenna, characterized in that said at least one transmitter node is a transmitter node according to claim 6.

12. A transmitter node for use in a MIMO based communication network involving several user terminals communicating with the transmitter node, wherein each of said user terminals comprises at least one antenna, said transmitter node comprising a plurality of transmit antennas arranged to transmit information to a plurality of receiver nodes, said transmitter node comprising:
    selection circuitry configured to select a first set of user terminals comprising at least one user terminal and a second set of user terminals not comprised in the first set;
    first adaptation circuitry configured to adapt first physical layer communication parameters for the first set of user terminals according to a first principle suitable for optimizing communication with the first set of user terminals;
    second adaptation circuitry configured to adapt second physical layer communication parameters, different from the first physical layer communications parameters, for the second set of user terminals according to a second principle which is different from the first principle in response to the first physical layer communication parameters for the first set; and a transmitter for transmitting to the first set of user terminals according to the first physical layer communication parameters and to the second set of user terminals according to the second physical layer communication parameters, wherein the first adaptation circuitry is arranged to optimize communication with the first set of user terminals with respect to full or partial Channel State Information (CSI) by Singular Value Decomposition (SVD), and wherein the second adaptation circuitry is arranged to optimize communication with the second set of user terminals according to opportunistic MIMO communication.

13. A transmitter node according to claim 12, wherein the first physical layer communication parameters are related to the transmit power and a beam-forming matrix at the transmitter side.

14. A transmitter node according to claim 12, comprising wherein the selection circuitry is arranged to select the first set of user terminals in dependence of traffic and quality of service parameters.

15. A transmitter node according to claim 12, wherein the selection circuitry is arranged to select the first set of user terminals in dependence of CSI knowledge.

16. A transmitter node according to claim 12, wherein the selection circuitry is arranged to select the first set of user terminals in dependence of receiver antenna configuration.

* * * * *

UNITED STATES PATENT AND TRADEMARK OFFICE
CERTIFICATE OF CORRECTION

| | |
|---|---|
| PATENT NO. | : 7,778,342 B2 |
| APPLICATION NO. | : 10/582997 |
| DATED | : August 17, 2010 |
| INVENTOR(S) | : Larsson et al. |

It is certified that error appears in the above-identified patent and that said Letters Patent is hereby corrected as shown below:

In the Specifications:

In Column 1, Line 57, in Equation (3), delete "$1g_2$" and insert -- $lg_2$ --, therefor.

In Column 1, Line 62, in Equation (4), delete "$N \cdot C_{SISI}$" and insert -- $N \cdot C_{SISO}$ --, therefor.

In Column 5, Line 57, delete "IX4." and insert -- TX4. --, therefor.

In Column 7, Line 46, delete "VS" and insert -- V5 --, therefor.

In Column 8, Line 6, delete "QOS," and insert -- QoS, --, therefor.

In Column 8, Line 61, delete "MS1, MS2, ......, SK." and insert -- $MS_1$, $MS_2$, ......, $MS_K$. --, therefor.

In Column 8, Line 63, delete "MS2, ..... MSK," and insert -- $MS_2$, ..... $MS_K$, --, therefor.

In the Claims:

In Column 9, Line 24, in Claim 1, delete "comprising;" and insert -- comprising: --, therefor.

In Column 10, Line 31, in Claim 8, after "claim 6," delete "comprising".

Signed and Sealed this
Twenty-fifth Day of January, 2011

David J. Kappos
*Director of the United States Patent and Trademark Office*